United States Patent Office 3,499,059
Patented Mar. 3, 1970

3,499,059
METHOD OF MAKING TOUGHENED POLYMERS FROM EMULSIONS OF IMMISCIBLE SOLUTIONS OF ELASTOMERS, THERMOPLASTIC POLYMERS AND ETHYLENICALLY UNSATURATED MONOMERS STABILIZED BY THE ADDITION OF BLOCK OR GRAFT COPOLYMERS
Gunther E. Molau and Henno Keskkula, Midland, Mich., assignors to The Dow Chemical Company, Midland, Mich., a corporation of Delaware
No Drawing. Filed Mar. 15, 1965, Ser. No. 439,948
Int. Cl. C08f 1/13, 19/08
U.S. Cl. 260—876
7 Claims

ABSTRACT OF THE DISCLOSURE

Stable emulsions of immiscible solutions of an elastomer and a resinous thermoplastic polymer are obtained by mixing with the immiscible solutions from 0.1 to 10 parts by weight of a graft or block copolymer containing moieties of said elastomer units and moieties of said thermoplastic resin units.

---

This invention concerns a method of making stable emulsions of immiscible solutions of elastomers and thermoplastic polymers, dissolved in ethylenically unsaturated monomers and relates to a method of making toughened thermoplastic polymers therefrom.

It is known to make toughened or high impact styrene polymer by uniformly and intimately incorporating with polystyrene a small amount of natural or a synthetic rubber either by mechanically blending a resinous styrene polymer with the rubber at elevated temperatures or by dissolving the rubber in monomeric styrene and heating the solution at elevated temperatures to polymerize the monomer and form a normally solid thermoplastic resinous product. Methods of making toughened or high impact styrene polymers are described in United States Patents Nos. 1,613,673; 2,616,864; 2,623,863; 2,862,906; 2,886,553; and 2,694,692. The high impact polymers are useful for various purposes, and are particularly useful in the making of molded articles or shaped articles made from extruded sheet, e.g. by vacuum forming, such as cups, containers, refrigerator liners, or refrigerator door liners and the like.

In making toughened polymers by dissolving an elastomer or synthetic rubber in an ethylenically unsaturated monomer capable of addition polymerization and heating the solution at elevated temperatures to polymerize the monomers and form a normally solid thermoplastic polymer, the occurrence of phase separation as indicated by opacity of the system is usually observed. We have found that during this process of polymerization, a significant change occurs in the character of the polymerizing solution, usually in the range of from about 5 to about 30 percent by weight of the monomer being polymerized. We have observed that the solution, that is initially a one-phase solution of the elastomer as the only solute dissolved in the monomer, changes to a two-phase system as monomer is polymerized forming a polymer as the second solute. Our microscopical investigations revealed that this two-phase system is, at first, a dispersion of droplets of the polymer solution in a continuous phase of the elastomer solution, and that a phase inversion occurs after which the system is a dispersion of droplets of the elastomer solution in a continuous phase of the polymer solution. We consider such a polymerizing system as an oil-in-oil emulsion and compare the occurring phase inversion of the phase inversion reported to occur under certain conditions in oil-water emulsions. On further polymerization, the oil-in-oil emulsions solidify to form the final polymer, in which the elastomer is dispersed in the form of fine particles. The size of these particles which is significant for the properties of the final polymer is established by the observed phase inversion.

If an elastomer is dissolved in a monomer capable of addition polymerization, together with a polymer of said monomer, the resulting system separates into two phases, namely into two immiscible solutions of the elastomer and the polymer. These phases can be dispersed in each other by rapid agitation, but the resulting dispersion is unstable and separates readily into two liquid layers. No satisfactory dispersion of rubber particles in the final polymer can be achieved when such an unstable dispersion is solidified by polymerization of the monomer.

We have now discovered that stable emulsions of immiscible solutions, which are obtained by dissolving an elastomer together with a polymer of said monomer in the monomer as a solvent, can readily be prepared by incorporating into the mixture of solutions as a stabilizing agent a small but effective proportion, within the range of from 0.05 to 5 percent, or more, of the weight of the mixture of solutions, of a graft copolymer or a block copolymer, of said elastomer and said monomer as more fully hereinafter described.

It has further been found that the stabilized emulsions of immiscible solutions of the elastomer, the polymer and the monomer can be heated without breaking of the emulsions at elevated temperatures, e.g. at temperatures between 60° C. and 260° C., in admixture with or without polymerization initiator and the monomer polymerized in usual ways such as in mass, or in aqueous suspension, to produce normally soild resinous thermoplastic products which are toughened polymers containing the elastomer uniformly dispersed throughout, and in the form of small particles intimately incorporated, and chemically combined, with the polymer.

The elastomers that can be employed in preparing toughened thermoplastic polymers can be any of a variety of elastomers such as natural rubber, synthetic rubber, rubbery copolymers of ethylene and propylene, polyisobutylene, polyisoprene, polybutadiene, copolymers of butadiene and styrene, copolymers of butadiene and acrylonitrile, or copolymers of butadiene and methyl isopropenyl ketone. In a preferred embodiment the elastomers are the synthetic butadiene polymers such as homopolymer of butadiene and copolymers of butadiene and styrene known to the art and commonly used as toughening agents for making high impact styrene polymers.

The monomers to be employed in making the stabilized emulsions of immiscible solutions of the invention can be any of a variety of ethylenically unsaturated monomers polymerizable by addition to form normally solid thermoplastic polymers. Examples of suitable monomers are the vinylidene aromatic hydrocarbons and nuclear halogenated vinylidene aromatic hydrocarbons such as styrene, vinyltoluene, vinylxylene, ethylvinylbenzene, isopropylstyrene, tert.-butylstyrene, chlorostyrene, dichlorostyrene, bromostyrene, fluorostyrene, mixtures of such vinylidene aromotic compounds and methyl methacrylate, acrylonitrile and/or alpha-methylstyrene, can also be used.

It is important, of course, that the monomer or mixture of monomers be a solvent for the elastomer and that the monomer be employed in substantially greater proportion than is the elastomer in order that the polymer be the continuous phase and the elastomer be the dispersed phase in the final product.

The polymer to be empolyed in preparing the stabilized emulsions of the immiscible solutions can be a homopolymer or a copolymer of the monomer or mixture of monomers used as the solvent or liquid medium with the proviso that the polymer be compatible with a polymer formed from the monomers. For example, if the monomer used as solvent is styrene, the polymer can be polystyrene or a copolymer of styrene and another monomer, e.g. methyl methacrylate, or acrylonitrile, which polymer is compatible with the polymer of the monomer, i.e. polystyrene, when each is dissolved in the monomer in a concentration of 5 percent by weight so as to provide a clear solution. Best results are usually obtained when the polymer is a polymer of substantially the same composition as is the polymer formed from the monomer or mixture of monomers used as solvent.

The solutions are prepared by dissolving from 1 to 20 parts by weight of the elastomer in from 40 to 90 parts by weight of the monomer or mixture of monomers, together with from about 9 to 40 parts by weight of the polymer, per 100 parts by weight of the sum of the weights of the elastomer, the monomer and the polymer, and intimately incorporating, or having intimately incorporated, with the solution of a very small but effective proportion of a graft copolymer or a block copolymer within the range of from 0.05 to 5 percent by weight, or more, of the solution, as a stabilizing agent.

The graft or block copolymer to be employed as stabilizing agent can be a graft copolymer of the elastomer and the monomer, or mixture of monomers, used in preparing the solution, or it can consist of a block copolymer of a monomer of the elastomer and the monomer used as solvent, or it can be a graft copolymer of a monomer of the polymer and the elastomer. For example, if the elastomer is homopolymer of butadiene and the monomer is styrene, the polymer to be used as stabilizing agent can be a graft copolymer of polybutadiene and styrene, a graft copolymer of polystyrene and butadiene, a block copolymer of styrene and butadiene or a graft copolymer of styrene or butadiene on a block copolymer of styrene and butadiene.

The block and graft copolymers can be prepared in known ways. For example, block copolymers of butadiene and styrene can be prepared by a procedure similar to that employed, by M. Szwarc et al. in J. Am. Chem. Soc., vol. 78, page 2656 (1956) or by the procedure empoyled by I. Kuntz in J. Poly. Sci., vol. 54, pages 569–586 (1961).

In brief, a block copolymer of butadiene and styrene is prepared by mixing butadiene and styrene with one another in an inert anhydrous liquid such as toluene, heptane or xylene in the desired proportions and adding to the cold or chilled solution a small amount or a desired proportion of butyl lithium and polymerizing the monomers. Graft copolymers of styrene upon polybutadiene or a copolymer of butadiene and styrene are readily prepared by dissolving the polymer in monomeric styrene and heating the solution in admixture with a polymerization initiating catalyst such as di-tert.-butyl peracetate or tert.-butyl perbenzoate and polymerizing the monomer preferably until from 10 to 25 percent of the monomer is polymerized.

The stabilized emulsions of immiscible solutions are useful for making high impact or toughened thermoplastic polymers and are particularly useful for making high impact styrene polymers. Examples of high impact styrene polymers are normally solid resinous thermoplastic polymer containing in chemically combined form at least 63.75 percent by weight of a monovinyl aromatic compound, not more than 21.25 percent by weight of a vinylidene compound selected from the group consisting of acrylonitrile, methyl methacrylate and alphamethyl styrene, and from 1 to 15 percent by weight of natural or a synthetic rubber which is a rubbery homopolymer of butadiene or a copolymer of a major proportion by weight, e.g. 50 percent by weight or more, of butadiene and a minor proportion of a monovinyl aromatic hydrocarbon such as styrene. Such styrene polymers and a method of making the same are described in United States Patent No. 2,694,692.

The stabilized emulsions of immiscible solutions can be polymerized by heating the same in mass with or without agitation and at temperatures between 60° and 260° C. at atmospheric, superatmospheric, or subatmospheric pressures, or by heating the solution while dispersed as droplets in an inert aqueous medium, i.e., in aqueous suspension, at suitable temperatures and pressures to substantially polymerize the monomer and form a normally solid thermoplastic product.

The polymer is recovered and is heated at elevated temperatures preferably under vacuum or subatmospheric pressure to remove volatile ingredients.

The following examples illustrate ways in which the principal of the invention has been applied but is not to be construed as limiting its scope.

EXAMPLE 1

(A) A charge of 75 grams of stereospecific polybutadiene, i.e. butadiene homopolymer, having a Mooney number of 35 ML 1+4 (212° F.) which polybutadiene was free from gels and consisted of over 90 percent 1,4 addition and less than 10 percent vinyl structure with the cis-1,4 configuration comprising from 32 to 35 percent of the polymer, said polymer being of narrow molecular weight distribution, and 375 grams of granular molding grade polystyrene having a viscosity characteristic of 20 centipoises as determined for a 10 weight percent solution of the polystyrene in toluene at 25° C., and 1050 grams of monomeric styrene were placed in a one gallon glass bottle and were rolled until the polymers were dissolved and a uniform solution was obtained, e.g. about 16 hours at room temperature. Thereafter, the solution was allowed to stand quiescent for 24 hours. The solution separated into two layers; an upper opaque layer consisting principally of polybutadiene and styrene monomer. Upon rolling of the bottle or shaking of the mixture the polymers were uniformly re-dispersed or distributed throughout the liquid. Upon standing quiescent, the liquid again separated into two layers in less than 16 hours.

(B) A graft copolymer was prepared by dissolving 200 grams of butadiene homopolymer similar to that employed in part A above in 1800 grams of monomeric styrene in a glass reaction vessel equipped with a reflux condenser and stirrer. A charge of 0.6 gram of benzoyl peroxide was added to the solution as polymerization initiator. Thereafter, the solution was stirred and heated at a temperature of 110° C. for a period of 3.25 hours, then was cooled to room temperature. The solution contained 23.6 percent by weight of solids. The polymeric solids consisted predominantly of a graft copolymer of about 57.5 percent by weight styrene and 42.5 percent polybutadiene substrate, dissolved in monomeric styrene.

(C) A charge of 75 grams of the solution of the graft copolymer prepared in part B above was added to the solution (now two layers of liquid) prepared in part A above. The resulting mixture was shaken gently by hand to uniformly distribute the polymeric ingredients throughout the liquid monomeric styrene. There was obtained an emulsion of the immiscible solutions. The emulsion was allowed to stand quiescent at room temperature. No separating of the emulsion into layers was observed over a period of three months. A test portion of the emulsion viewed under a microscope was found to be a dispersion of the polybutadiene, distributed throughout the solution of the polystyrene and monomeric styrene as the continuous phase. The emulsion possessed remarkable stability against separating into layers of liquid.

(D) The stabilized emulsion prepared in part C above was divided into two equal parts. In one test, portions of the stabilized emulsion were placed in screw-cap glass bottles of 3 cm. diameter by 13.5 cm. long. The emulsion was heated in the closed bottles by immersing them in an oil bath maintained at 130–135° C., for a period of 120 hours to polymerize the monomer. The polymer was recovered by breaking the glass bottles and separating it from the glass. The polymer was ground to a granular form, then was mechanically worked at a temperature of 200° C. in a Banbury mixer for a period of 7 minutes after which the polymer was cooled and ground to a granular form suitable for molding. Portions of the polymer were compression molded at 420° F. and 700 pounds per square inch gauge pressure. Test bars of ½ x ⅛ x 4 inches long were cut from the molded sheet. These test bars were used to determine elongation and tensile strength values for the polymer employing procedures similar to those described in ASTM D638–57T. In part strength was determined by procedure similar to that described in ASTM D256–57T. Molded and extruded articles prepared from the polymer were an opaque white color, were free from surface blemishes and had a high gloss. The polymer had the properties

| | |
|---|---|
| Tensile strength lbs./sq. in. | 4676 |
| Elongation percent | 1.4 |
| Notched impact strength ft.-lbs. | 0.85 |
| Volatile percent | 1.0 |

(E) In another test a charge of 750 grams of the remaining one-half of the stabilized emulsion prepared in part C above, together with 0.02 percent by weight of di-tert.-butyl peroxide and 0.2 percent by weight of 2,6-di-tert.-butyl-4-methylphenol, was placed in pressure resistant vessel equipped with a stirrer, together with 450 grams of water containing dissolved therein 7.5 grams of crude sodium carboxymethyl methyl cellulose, consisting of one-third part by weight of sodium carboxylmethyl methyl cellulose, a cellulose derivative having an average of 0.25 —OCH$_2$COOH group and 1.8 —OCH$_3$ groups per mole of cellulose, one-third part by weight of water, as dispersing agent. The crude sodium carboxymethyl methyl cellulose had a viscosity of 1700 centipoises as determined for a 2 weight percent solution of the material in water at 25° C. The resulting mixture was stirred to maintain the liquid starting material suspended as droplets in the aqueous medium and was heated in the closed vessel to polymerize the monomer under time and temperature conditions as follows: 4 hours at 130° C.; 4 hours at 140° C.; and 2 hours at 150° C. Thereafter, the vessel was cooled, was opened and the polymer product removed. The product was separated by filtering and was washed with water and dried. The dried polymer was mechanically worked in a Banbury mixer at 200° C. for 7 minutes then was removed, was cooled and was ground into a granular form. Portions of the polymer were compression molded at 420° F. and 700 pounds per square inch gauge pressure. Test bars of ½ x ⅛ x 4 inches long were cut from the molded sheet. These test bars were used to determine tensile strength and elongation values for the product employing procedures similar to those described in ASTM D638–57T. Impact strength was determined by procedure similar to that described in ASTM D256–57T. Molded and extruded articles prepared from the polymer were a white to light tan color, were free from surface blemishes and had a high gloss. The product had the properties:

| | |
|---|---|
| Tensile strength lbs./sq. in. | 4163 |
| Elongation percent | 2.7 |
| Notched impact strength ft.-lbs. | 0.57 |
| Volatile percent | 1.40 |

EXAMPLE 2

The experiments of Example 1 where repeated, except that a charge of 15 grams of the solution of the graft copolymer of styrene and butadiene prepared in part B of said example was added to a solution of elastomer and polymer similar to that prepared in part A of said example to stabilize said immiscible solutions and form a stable emulsion. The results were similar to those obtained in parts C, D and E of Example 1.

EXAMPLE 3

(A) A graft copolymer was prepared by dissolving 200 grams of GR–S type synthetic rubber FRS–206 (a copolymer prepared by a hot emulsion ploymerization recipe of a mixture of about 76.5 percent by weight of butadiene and 23.5 percent of styrene), in 1800 grams of monomeric styrene in a reaction vessel equipped with a reflux condenser and stirrer. A charge of 0.6 gram of benzoyl peroxide was added. The mixture was stirred and heated at a temperature of 110° C. for a period of 3.25 hours, then was cooled to room temperature. The solution contained 27 percent by weight of solids. The polymeric solids consisted of a predominant amount of a graft copolymer of about 63 percent by weight of styrene and 37 percent copolymer of styrene and butadiene substrate.

(B) A charge of 15 grams of the solution of the graft copolymer prepared in part A of this example, 75 grams of polybutadiene similar to that employed in part A of Example 1, 375 grams of molding grade polystyrene and 1050 grams of monomeric styrene were placed in a one gallon glass jar and rolled at room temperature for a period of about 16 hours. The product was a stable emulsion of the rubber uniformly dispersed throughout the liquid. The emulsion did not separate into layers upon standing or storing at room temperature.

EXAMPLE 4

(A) A graft copolymer was prepared by dissolving 200 grams of Chemigum N–615, (a copolymer of about 67 percent by weight butadiene and 33 percent acrylonitrile) in a mixture of monomers consisting of 500 grams of acrylonitrile and 1300 grams of styrene in a glass reaction vessel equipped with a reflux condenser and stirrer. A charge of 2 grams of benzoyl peroxide was added. The mixture was stirred and was heated at a temperature of 90° C. for a period of 3 hours, then was cooled to room temperature. The solution contained 23.6 percent by weight of polymer solids. The polymeric solids consisted predominantly of a graft copolymer of styrene and acrylonitrile upon the acrylonitrile-butadiene copolymer.

(B) A charge of 30 grams of the solution of the graft copolymer prepared in part A of this example, 75 grams of a rubbery copolymer of about 67 percent by weight butadiene and 33 percent acrylonitrile, 375 grams of a resinous copolymer of about 73 percent by weight of styrene and 27 percent acrylonitrile and 1050 grams of a mixture of monomers consisting of 73.4 percent by weight styrene and 26.6 percent acrylonitrile, were placed in a one gallon glass jar and rolled at room temperature for a period of 16 hours. There was obtained a stable emulsion of the nitrile rubber uniformly dispersed in the liquid. The emulsion did not separate upon standing at room temperature for a period of 3 months.

(C) A portion of the stabilized emulsion was polymerized in aqueous suspension to form a resinous thermoplastic product employing procedures similar to that employed in part E of Example 1. The product had the properties:

| | |
|---|---|
| Tensile strength lbs./sq. in. | 8138 |
| Elongation percent | 1.8 |
| Impact strength ft.-lbs. | 0.32 |
| Volatile percent | 2.19 |

EXAMPLE 5

(A) A graft copolymer was prepared by dissolving 200 grams of polybutadiene similar to that employed in part A of Example 1, in 1800 grams of monomeric methyl methacrylate. A charge of 0.6 gram of benzoyl peroxide was added. The solution was stirred and heated at a temperature of 90° C. for a period of 7.25 hours, then was cooled to room temperature. The solution contained 29.5 percent by weight of polymeric solids. The polymeric solids consists of a graft copolymer of about 66 percent by weight methyl methacrylate and 34 percent polybutadiene.

(B) A charge of 15 grams of the solution of the graft copolymer prepared in part A of this example, 75 grams of polybutadiene similar to that employed in part A of Example 1, 375 grams of polymethyl methacrylate and 1050 grams of monomeric methyl methacrylate, were placed in a one gallon glass bottle and rolled at room temperature for a period of 16 hours. There was obtained a stable emulsion of the polybutadiene rubber dispersed in the liquid. No separating of the emulsion into layers occurred after standing at room temperature for 3 months.

(C) A portion of the stabilized emulsion was polymerized in mass employing procedures similar to those employed in part D of Example 1. The product had the properties:

Tensile strength _____lbs./sq. in__ 5867
Elongation _____percent__ 1.8
Impact strength _____ft.-lbs__ 0.5
Volatile _____percent__ 2.02

EXAMPLE 6

A graft copolymer was prepared by dissolving 200 grams of polybutadiene similar to that employed in part F of Example 1, in a mixture of 630 grams of styrene and 1170 grams of methyl methacrylate in a glass reaction vessel equipped with a reflux condenser and stirrer. A charge of 0.6 gram of benzoyl peroxide was added. The mixture was stirred and heated at a temperature of 90° C. for a period of 6 hours and 40 minutes, then was cooled to room temperature. The solution contained 17.6 percent by weight of polymer solids. The polymer solids consisted predominantly of a graft copolymer of styrene and methyl methacrylate upon the polybutadiene.

(B) a charge of 15 grams of the solution of the graft copolymer prepared in part A of this example, 75 grams of polybutadiene similar to that employed in part A of Example 1, 375 grams of a resinous copolymer of 34 percent by weight of styrene and 66 percent of methyl methacrylate, and 1050 grams of a mixture of monomers consisting of 31.8 percent by weight of styrene and 68.2 percent of methyl methacrylate, were placed in a one gallon glass jar and rolled for a period of 16 hours at room temperature. There was obtained a stable emulsion of the polybutadiene rubber dispersed in the liquid. The emulsion did not separate upon standing at room temperature for 3 months.

(C) A portion of the emulsion prepared in part B of this example was polymerized in mass to form a resinous thermoplastic product employing procedure similar to that employed in part D of Example 1. The product had the properties:

Tensile strength _____lbs./sq. in__ 6285
Elongation _____percent__ 3.1
Impact strength _____ft.-lbs__ 0.43
Volatile _____percent__ 0.89

EXAMPLE 7

(A) A block copolymer was prepared by dissolving 6 parts by weight of butadiene and 14 parts by weight of styrene in 80 parts by weight of ethylbenzene, cooling the solution and adding a small amount of butyl lithium to the chilled solution, and allowing the polymerization reaction to proceed. The solution contained 20 percent by weight of polymer solids. It was a block copolymer. The block copolymer had a viscosity characteristic of 20 centipoise as determined for 65 weight solution of the polymer in toluene at 25° C.

(B) A charge of 5 grams of the solution of the block copolymer prepared in part A of this example, 75 grams of polybutadiene rubber similar to that employed in part A of Example 1, 375 grams of polystyrene and 1050 grams of monomeric styrene were placed in a one gallon glass bottle and rolled for 16 hours at room temperature. There was obtained a stable emulsion of the polybutadiene rubber and the liquid.

We claim:
1. A method of making a toughened thermoplastic polymer which comprises
   (A) admixing from 1–20 parts by weight of a butadiene elastomer, from 9–40 parts by weight of a normally solid thermoplastic polymer, and from 40–90 parts by weight of a polymerizable solvent selected from the group consisting of the monomers methyl methacrylate, monovinyl aryl hydrocarbons and mixtures of monovinyl aryl hydrocarbons with methyl methacrylate, acrylonitrile and alpha-methyl styrene, said thermoplastic polymer having been obtained by polymerizing one or more of the monomers employed as said solvent with the proviso that said thermoplastic polymer be compatible with the polymer of the monomer employed as said solvent, whereby a system is formed containing two separate and immiscible solutions, one solution containing said elastomer dissolved in said monomer, the other containing said thermoplastic polymer dissolved in said monomer;
   (B) adding to the system so formed, as a stabilizing agent to inhibit separating of the system into layers of immiscible liquids, from 0.1 to 5 parts by weight of said solvent system of a separately prepared polymer selected from the group consisting of (1) graft copolymers of a butadiene elastomer and a monomer selected from the group employed as said solvent. (2) graft copolymers of a polymer formed by polymerizing one or more of the monomers employed as said solvent and a monomer of said elastomer, and (3) block copolymers of a monomer of said elastomer and one or more of the monomers employed as said solvent;
   (C) agitating the solvent system containing said stabilizing agent to form a stable emulsion of the immiscible solutions; and
   (D) heating said stabilized emulsion at temperatures between 60° and 260° C. to substantially polymerize said polymerizable solvent and form a normally solid thermoplastic resinous polymer containing said elastomer in chemically combined and interpolymerized form uniformly distributed throughout.

2. A method as claimed in claim 1, wherein the polymerization is carried out in mass.

3. A method as claimed in claim 1 wherein the polymerization is carried out in aqueous suspension.

4. A method as claimed in claim 1 wherein the polymerization is carried out in the substantial absence of agitation in the mass of said liquid until about 20 percent by weight of the monomers have been polymerized.

5. A method as claimed in claim 1, wherein said elastomer is a stereospecific homopolymer of butadiene, said solvent is styrene, said thermoplastic polymer is polystyrene, and said stabilizing agent is a graft copolymer of polybutadiene and styrene.

6. A method as claimed in claim 1 wherein said elastomer is sterospecific homopolymer of butadiene, said solvent is a mixture of styrene and methyl methacrylate, said thermoplastic polymer is a copolymer of styrene and methyl methacrylate, and said stabilizing agent is a graft copolymer of polybutadiene and a mixture of styrene and methyl methacrylate.

7. A method as claimed in claim 1, wherein said elastomer is a copolymer of butadiene and acrylonitrile, said solvent is a mixture of styrene and acrylonitrile, said thermoplastic polymer is a copolymer of styrene and acrylonitrile and said stabilizing agent is a graft copolymer of said elastomer and a mixture of styrene and acrylonitrile.

(References on following page)

References Cited

UNITED STATES PATENTS

| | | | |
|---|---|---|---|
| 3,095,388 | 6/1963 | Osmond et al. | 260—4 |
| 3,144,420 | 8/1964 | Fryling | 260—876 XR |
| 3,166,524 | 1/1965 | Schmidle et al. | 260—23 |
| 3,243,481 | 3/1966 | Ruffing et al. | 260—880 |
| 3,264,234 | 8/1966 | Osmond | 260—4 |
| 3,267,178 | 8/1966 | Lee | 260—880 |
| 3,278,642 | 10/1966 | Lee | 260—880 |

FOREIGN PATENTS 870,650  6/1961  Great Britain.

SAMUEL H. BLECH, Primary Examiner

K. E. KUFFNER, Assistant Examiner

U.S. Cl. X.R.

260—4, 17.4, 29.7, 879, 880